Dec. 7, 1926.

M. GOODLOE 1,610,003

VACUUM JACKETED GAUGE GLASS

Filed August 6, 1923

INVENTOR:
Meade Goodloe,
By Graham + Lauis
ATTORNEYS.

Patented Dec. 7, 1926.

1,610,003

UNITED STATES PATENT OFFICE.

MEADE GOODLOE, OF LOS ANGELES, CALIFORNIA.

VACUUM-JACKETED GAUGE GLASS.

Application filed August 6, 1923. Serial No. 655,866.

My invention relates to gauges particularly useful for refrigerating apparatus, for indicating the level, or the amount of refrigerating liquid contained in the receptacle holding said liquid.

Gauges of this type being exposed to the atmosphere very readily become frosted on the outside by freezing of the atmospheric moisture, which prevents the liquid in the gauge from being seen, thus making it impossible to read the gauge in order to determine the level of the refrigerating liquid in the refrigerating receptacle.

The general object of my invention is to provide a gauge of the character stated comprising means for preventing the formation of frost on the gauge tube and whereby said tube is maintained visible, so that it may be read.

A more particular object is to provide a gauge as above described comprising a transparent vacuum tube (i. e., a tube in which the residual gas is considerably rarefied by exhaustion) surrounding the gauge tube, whereby frost is prevented from forming on the gauge tube.

A further object is to provide a refrigerating gauge comprising a liquid gauge vessel, which may be in the form of a tube, a transparent vacuum vessel which may also be in the form of a tube surrounding and formed integral with said gauge tube, to prevent formation of frost on said gauge tube, and resilient means for allowing expansion and contraction of said gauge tube with relation to said vacuum tube.

Further objects and advantages will be made evident hereinafter.

Referring to the drawing which is for illustrative purposes only.

Figure 1:
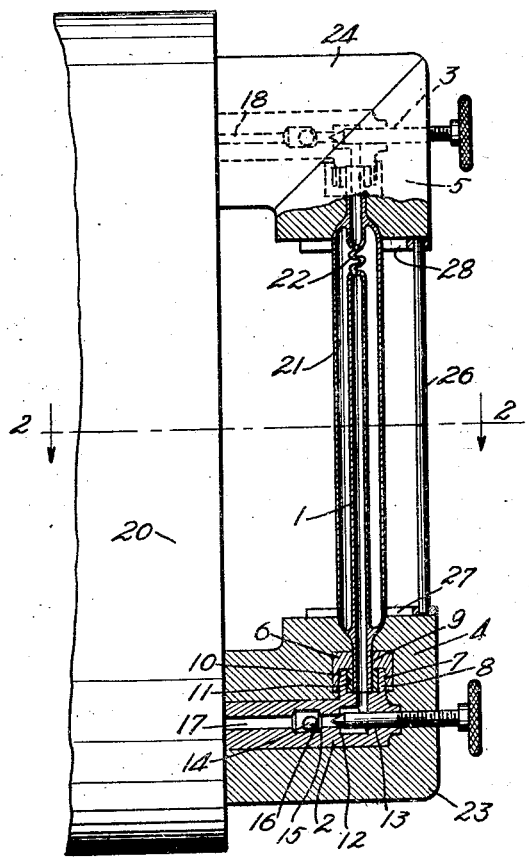
Fig. 1 is a vertical longitudinal section of a refrigerating gauge embodying my invention.
Figure 2:
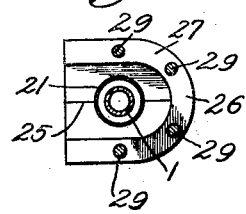
Fig. 2 is a horizontal section of my gauge taken on line 2—2 of Fig. 1.
Figure 3:
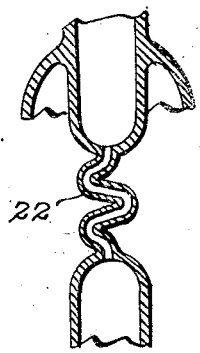
Fig. 3 is an enlarged detail view showing a section which may be regarded as following the curvatures of a helix, as hereinafter described.

In the drawing, 1 indicates a gauge tube; 2 and 3 upper and lower valves respectively coupled to the lower and upper ends of said gauge tube by couplings 4 and 5. Each coupling 4 and 5 comprises a threaded collar 6 which surrounds the gauge tube 1 near one end thereof, and is screw-seated as at 7 on a vertical nipple 8 formed on each valve 2 and 3, the head 9 of which collar engages the end of said nipple, and the outer edge of a collar 10 surrounding one end of the gauge tube 1 and fitting within a recess 11 in said nipple. Each valve 2 and 3 comprises a seat 12 and a screw valve member 13 for engaging said seat to close the valve, by means of which valves the liquid may be manually shut off from the gauge tube for changing the tube. Each valve 2 and 3 also includes a check valve 14, which check valve comprises a seat 15 and a ball 16 for engaging said seat to close the valve, to automatically shut off the liquid in case of breakage of the gauge tube. The valves 2 and 3 are formed with rearwardly extending conduits 17 and 18 which connect respectively at different heights to the refrigerating receptacle 20.

A vacuum tube 21 constituting a transparent means of thermal insulation surrounds the gauge tube 1 and is formed integral at its ends with said gauge tube near the ends respectively of the latter tube. The gauge tube is restricted for a short distance in the form of a tubular helix 22 within the upper end of the vacuum tube 21, which restricted helix forms resilient means for allowing expansion and contraction of the gauge tube 1 with relation to the vacuum tube 21. The air being exhausted from the vacuum tube 21, freezing of atmospheric moisture on the outside of a gauge 1, and the deposit of frost on said tube, is thereby prevented. The rarefication of the medium between the glasses prevents moisture from collecting on the inner tube and the liquid within the gauge tube 1 is maintained visible through said tube and the vacuum tube 21, thus enabling the gauge to be read and the amount of refrigerating liquid in the refrigerating receptacle determined under all conditions of temperature.

The valves 2 and 3 and the adjoining ends of the gauge tube 1 and vacuum tube 21 are enclosed within jackets 23 and 24 of heat and cold insulating material such as cork, each of which jackets being split longitudinally as indicated at 25 so that it may be readily applied to or removed from the parts of the gauge which it covers. A cage 26 extends partially around the front and sides of the tubes 21 and 1 between the jackets 23 and 24, said cage comprising lower and upper U-shaped members 27 and 28 respectively secured to the upper and lower ends of the jackets 23 and 24 and vertical rods 29 secured respectively at their lower and upper ends in said U-shaped members 27 and 28 in front of and at the sides of the vacuum tube 21 and gauge tube 1 to protect said tubes.

I claim as my invention:

1. A gauge for refrigerating apparatus including a gauge tube for showing the refrigerating liquid, an outer transparent tube surrounding said gauge tube and formed integral at its ends with said gauge tube, the air being exhausted from said outer tube to prevent formation of frost on either of said tubes, and said gauge tube being restricted for a short portion of its length and shaped to allow for relative expansion and contraction of said tube with relation to said outer tube.

2. A gauge for refrigerating apparatus including a gauge tube for showing the refrigerating liquid, a transparent outer tube surrounding said gauge tube and formed integral with said gauge tube, the air being exhausted from said outer tube to prevent formation of frost on either of said tubes, and said gauge tube being formed with a helically coiled tubular portion to allow for expansion and contraction of said gauge tube with relation to said outer tube.

In testimony whereof, I have hereunto set my hand at Los Angeles, California, this 30th day of July, 1923.

MEADE GOODLOE.